Nov. 24, 1959 P. S. MORGAN 2,913,954
COMBINED ZOETROPE AND PHONOGRAPH
Filed July 16, 1953 3 Sheets-Sheet 1

INVENTOR
Porter S. Morgan
BY Johnson and Kline
ATTORNEYS

Nov. 24, 1959
P. S. MORGAN
2,913,954
COMBINED ZOETROPE AND PHONOGRAPH
Filed July 16, 1953
3 Sheets-Sheet 2
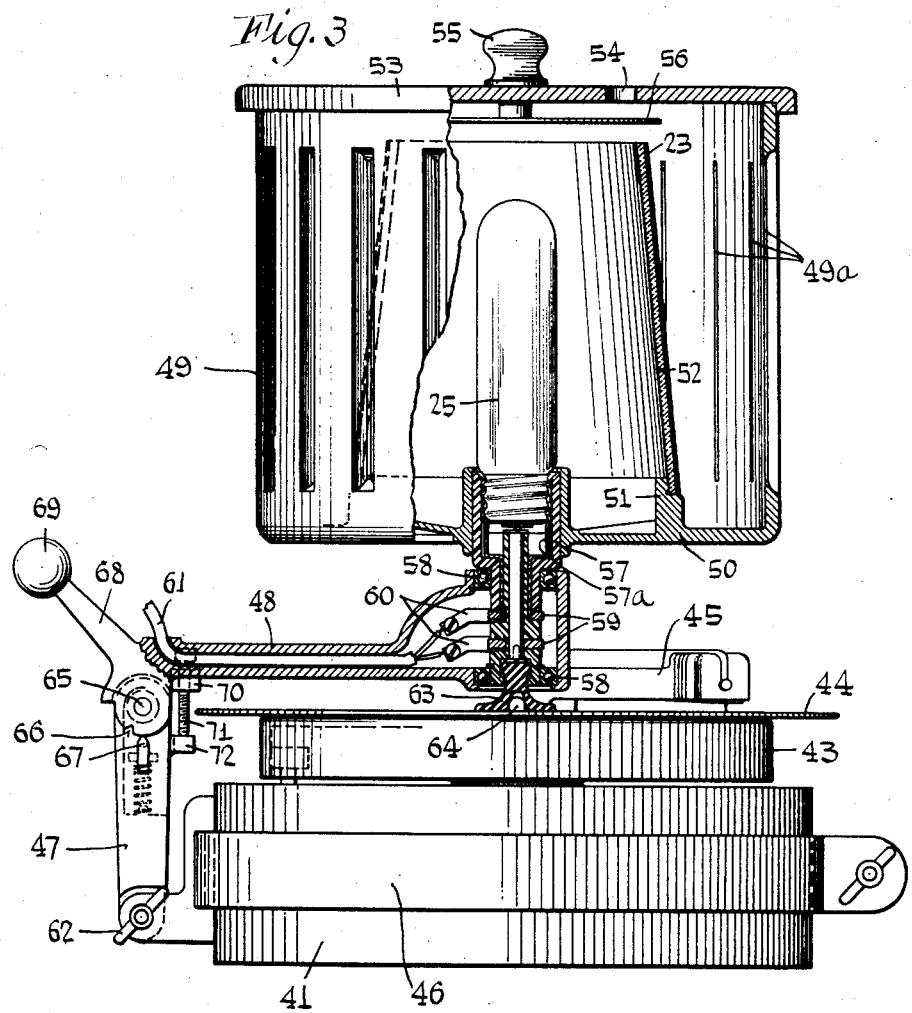
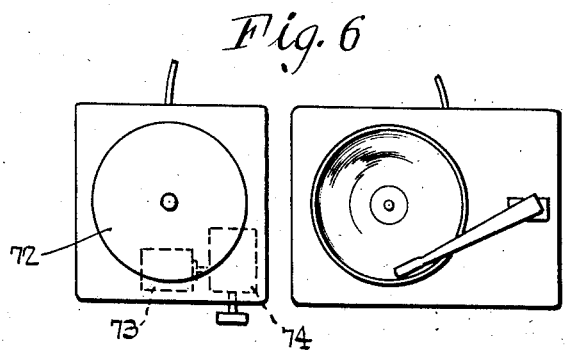
INVENTOR
*Porter S. Morgan*
BY *Johnson and Kline*
ATTORNEYS Nov. 24, 1959     P. S. MORGAN     2,913,954
COMBINED ZOETROPE AND PHONOGRAPH Filed July 16, 1953     3 Sheets-Sheet 3

INVENTOR
*Porter S. Morgan*

BY *Johnson and Kline*
ATTORNEYS

United States Patent Office 2,913,954
Patented Nov. 24, 1959

2,913,954
COMBINED ZOETROPE AND PHONOGRAPH

Porter S. Morgan, Westport, Conn., assignor to Morgan-Whitney-Matarese Corporation, Burlington, N.J., a corporation of New Jersey Application July 16, 1953, Serial No. 368,466

1 Claim. (Cl. 88—16.2)

This invention relates to entertainment apparatus, and more particularly to the type known as a zoetrope in which a picture support, having a continuous succession of pictures in progressively changing attitudes of movement displayed through scanning means, is rotated with the scanning means to produce a view in motion which, as a whole, may be static or may be caused to travel forward or backward.

According to the present invention, provision is made for combining the zoetrope with a phonograph so that music or other sound may be reproduced at the same time the zoetrope picture is being exhibited, to the great amusement and pleasure of those present, particularly of young children.

Preferably, the zoetrope picture and the phonograph record are related in subject matter, or in the tempo of the music or other sound and the timing of the animations of the zoetrope pictures. For instance, a phonograph record of the composition "Parade of the Wooden Soldiers" would be combined with a zoetrope picture of toy soldiers marching in step with the music. To this end, the successive zoetrope pictures are drawn and the record is made to be in synchronism when the phonograph and zoetrope are operated, respectively, at determinate speeds, preferably the same speed.

According to the present invention, the zoetrope and phonograph may be combined in a single structure suitable for use in the nursery or child's bedroom, or the zoetrope may be attached, or otherwise associated with portable and other phonographs of which there are many thousands in existance and use. When furnished as an adjunct or attachment, the zoetrope device is provided with means whereby its speed may be varied to synchronize the picture with the record.

Provision is made, according to the present invention, for interchanging the zoetrope pictures as well as the phonograph records—the zoetrope device being provided with a mandrel to removably support a sleeve-like picture structure. Preferably, the picture structure is a thin flexible sleeve of paper or film so that it may be folded flat for shipping and storing with its related phonograph record disk, and in such case the sleeve is made to taper slightly toward one end and the mandrel is made frusto-conical to fit the sleeve and make the sleeve lie smoothly in driving relation with the mandrel.

Other features and advantages will hereinafter appear.

In the accompanying drawings:

Fig. 3 is a front elevation, partly in section, showing another construction in which the zoetrope drum is mounted above the phonograph turntable.

Fig. 6 is a plan view showing an arrangement wherein the zoetrope and phonograph are physically separate.

Figure 1:
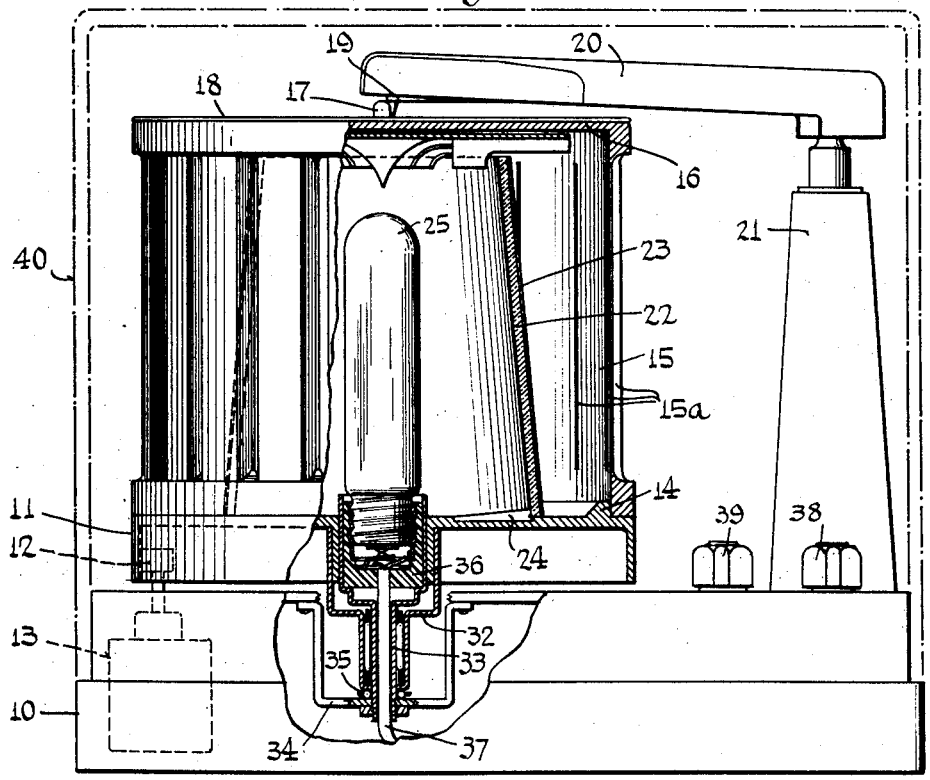
Figure 1 is a front elevation, partly in section, showing one form of this invention in which the phonograph turntable forms the top of the zoetrope drum.
Figure 2:
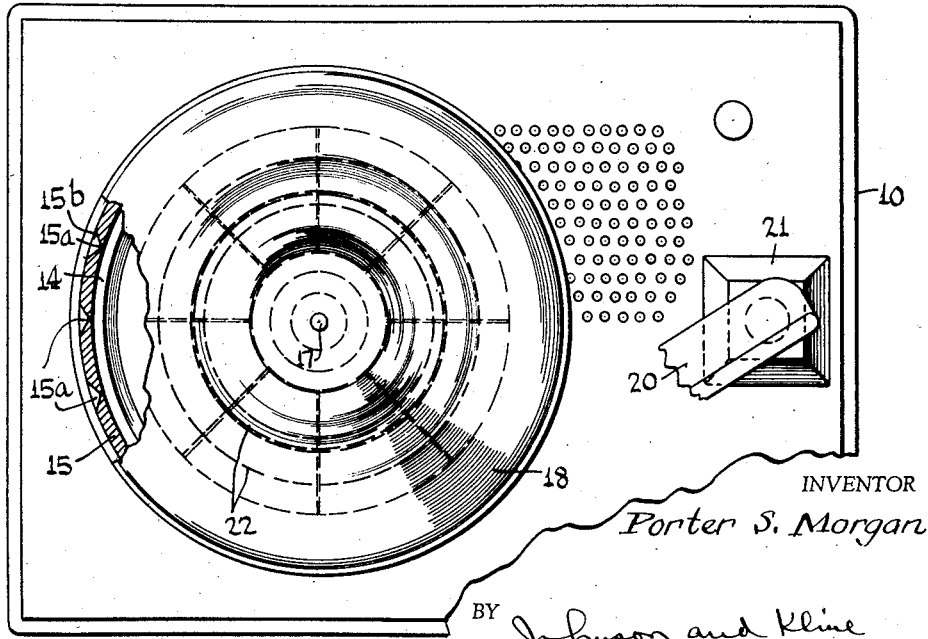
Fig. 2 is a plan view of the device shown in Fig. 1, with portions of the turntable broken away to show the underlying drum structure.

Referring to Figs. 1 and 2, the device comprises a base 10 on which is rotatably mounted a table 11 driven by a wheel 12 connected to a motor 13. The table 11 has an annular flange 14 near its circumference to position a zoetrope drum 15, the lower edge of which rests on the table 11 between the flange 14 and the periphery of the table. The top portion of the drum 15 constitutes a turntable 16 having an appropriate pin 17 to center a disk record 18 which may be supported on the table 16 for rotation therewith in the usual manner. A pickup device 19 is supported by an arm 20 mounted on a standard 21 carried by the base 10 and held at such height as to be substantially horizontal parallel to but spaced above the record turntable 16.

Within the zoetrope drum 15 there is located a mandrel 22 for supporting a picture record 23 to be viewed through scanning slots 15a in the drum.

Figure 5:
Fig. 5 is an edge view of the picture record folded flat, as when being shipped or stored.

According to the present invention, the picture record 23 consists of a flexible paper strip or film, the ends of which are secured together to form a sleeve or cuff which may be removably mounted on the mandrel 22 and, when removed, flattened as shown in Fig. 5 so as to occupy little space, and may be superposed on the phonograph record with which it is related and placed in the usual record-holding envelope for shipment or storage when out of use.

To cause the picture record 23 to lie smoothly on the mandrel 22, the mandrel is made frusto-conical and the picture record is made to have the same taper as the mandrel so that as the record is slid over the mandrel it is stretched taut on the surface of the mandrel to be securely held thereby for rotation therewith.

In the form shown in Figs. 1 and 2, the mandrel 22 is mounted on the table 11 and is located concentric therewith by engaging the ends of radial ribs 24. The mandrel is made of transparent or at least translucent material, such as glass or plastic, so that light emanating from a lamp 25 within the mandrel will pass through the same and through the more or less transparent portions, depending on color, of the picture record to illuminate the latter.

Figure 4:
Fig. 4 is a fragmentary view of a portion of the picture record.

As shown in Fig. 4, the picture record 23 has extending around it a continuous succession of pictures 26, 27, 28, 29 and 30 so spaced with relation to the scanning slots 15a of the zoetrope drum that when the drum is rotated continuous pictures are viewed from the exterior side of the drum. The pictures can be so made as to give the optical illusion of animated objects, non-traveling or traveling to the right or left, or to show static inanimate pictures. For instance, a series of pictures 26 may be so spaced that the sleigh shown appears to travel to the right. The pictures 27 may be spaced so that the representation of Santa Claus' head does not travel but his facial expressions change, and his beard and tassel on his cap move from side to side. The pictures 28 of the reindeer are spaced to give the appearance of leaping movements. The scenic pictures 29 are spaced to travel to the left, resulting in illusion of the reindeer traveling forwardly. The pictures 30 may be static, the only movement being that of the figure in the jack-in-the-box.

The background of the picture record may have other pictures such as stars 31 which by their spacing give the illusion of twinkling. By blocking out the window of the house in pictures 29 the illusion is given of the lights within the house being turned "on" and "off."

The scanning slots 15a are of such width and spacing as to give the desired optical effect when the zoetrope drum is rotated within the range of the speeds of the phonograph with which it is used.

The pictures may be in black and white or may be colored as desired. They may be manufactured by printing or lithographing processes as most convenient.

Specific reference to the picture record 23 is made merely by way of example and it should be understood that any pictures or arrangements thereof may be used within the scope of this invention.

In addition, according to the present invention in its preferred form, the phonograph record is so recorded and the picture record so made that in each complete revolution of the picture record the action shown is a complete cycle of movements starting from and returning to the same position, and the phonograph record is so made that one or more complete measures are reproduced in each complete revolution of the record. Thus, when the picture record and the phonograph record are rotated at the same speed, i.e. r.p.m., the rhythm of the action shown and the sound produced will be in synchronism.

For example, with the picture record shown in Fig. 4, the leaping movements of the deer will be in synchronism with the time of the song called "Rudolph the Red Nosed Reindeer," greatly adding to the enjoyment and amusement of the observer. Another set of phonograph and picture records could include the phonograph record of "The Parade of the Wooden Soldiers," and in this case the illustration of a toy soldier would show it marching in time with the music.

While these illustrations have been given in connection with musical selections, it should be understood that they could also be given in connection with recitations. For instance, if the recitation were that of "The Little Engine That Could" the sound of the puffing of the little engine would be in synchronism with the pictures showing the engine puffing. Many other examples could be given, but these will now be obvious to those experienced in such matters.

When, as shown, the scanning drum is made of non-metallic material and has rather thick walls for strength and sturdiness, the material of the wall is beveled off at 15b at each side of the scanning slot 15a so that the thickness of the wall will not cut down on the effective width of the slot as the drum rotates.

Within the scope of this invention, any suitable mounting means for the turntable 11 and the lamp 25 may be employed, but for the purpose of illustration I have shown the turntable mounted on a sleeve 32 bearing on another sleeve 33 secured to a bracket 34 carried by the frame 10. To reduce friction, thrust bearings 35 may be inserted between the lower end of the sleeve 32 and the lower end of the bracket 34. The sleeve 33, being mounted in the bracket 34 against rotation, carries at its upper end an insulating block 36 having suitable contacts to form a socket for the lamp 25, and wires 37 supplying these contacts with current extend upwardly through the sleeve 34. Suitable knobs 38 and 39 leading to well-known mechanism may be used to control the starting and stopping of the motor 13 and the volume of the sound produced. A cover 40, illustrated in dotted lines, may be placed over the base 10 to protect the mechanism in shipping and when it is out of use.

The embodiment of the invention shown in Figs. 1 and 2 is well adapted for manufacture and shipment as a combined zoetrope and phonograph unit. However, there are many thousands of portable phonographs in use, and to make the combined zoetrope and phonograph by utilizing those in use, an arrangement such as shown in Fig. 3 may be employed in which the zoetrope mechanism is mounted independently of the phonograph turntable and may be applied to the phonograph as an attachment.

As shown in Fig. 3, the phonograph has its own base 41 with its driving and reproducing mechanism, and its own turntable 43 for receiving a phonograph record 44 over which is placed the usual pick-up arm 45 to produce the sound on the record.

According to the present invention, as shown in Fig. 3, suitable mechanism is provided to support the zoetrope drum above the phonograph in use and drive the zoetrope drum and picture support from the phonograph record. For this purpose, the attachment comprises a suitable clamp 46 to be secured to the casing 41 of the phonograph and this clamp carries a vertically extending arm 47 having pivotally mounted at its upper end a frame 48 extending over the turntable 43. The zoetrope drum 49 is rotatably mounted in the frame 48 and comprises a base portion 50 having a shouldered flange 51 for receiving the picture record support 52. The sides of the drum 49 are provided with tapered scanning slots 49a through which a picture record 23 supported on the support 52 may be viewed. A lamp 25 is supported within the picture support 52. The top of the drum 49 is provided with a cover 53 having ventilating openings 54 and a knob 55 by means of which it may be removed so as to permit the mounting and removal of a picture record from the picture support. The cover 53 carried a baffle 56 so that light from the lamp 25 will not shine through the ventilating openings 54.

In this form of the invention, the base 50 of the zoetrope drum is secured to a sleeve 57 which is mounted by means of ball bearings 58 in the frame 48, and the upper end of the sleeve 57 carries a socket 57a having contacts for engagement with those on the lamp 25. The lamp socket rotates with the zoetrope drum, and, to carry current to the lamp, collector rings 59 are carried by the sleeve 57 and engage contacts 60 connected to current supply wires 61—the rings 59 being connected to the contacts in the socket for the lamp.

To adapt the mounting means to phonographs of different makes or sizes, the supporting arm 47 is pivotally carried by the clamp 56 and may be swung toward or from the phonograph case 41 in order to make the axis of the drum 49 coincide with the axis of the turntable 43 of the phonograph. After adjustment, the arm 47 is secured in place by a suitable clamp 62.

According to the present invention, the zoetrope drum 49 is driven by the phonograph by a coupling device 63 secured to the end of the sleeve 57 and located in position to overlie the centering pin 64 of the phonograph. The coupling device 63 is in the form of a rubber cup which frictionally connects the zoetrope drum to the phonograph record supported by the turntable 43, and thus the zoetrope drum is driven at the same speed as the phonograph record.

To permit the phonograph record to be removed and another applied to the turntable 43, the frame 48 is pivotally mounted at 65 on the arm 47 so that the frame and the zoetrope drum can be swung upwardly and to the side to remove the coupling 63 from the phonograph record and provide sufficient space between the table 43 and the frame 48 for the removal and replacement of phonograph records. If desired and as shown, the frame 48 may be provided with a notch 66 to be engaged by a spring-urged detent 67 which will hold the zoetrope drum 48 at the desired elevation above the record turntable 43. A handle 68 on the frame provided with a suitable counterweight 69 may be employed to manipulate the frame 48.

In some cases, the zoetrope drum with its zoetrope frame 48 and parts mounted thereon may be supported through the coupling 63 by the phonograph record and its turntable. However, to permit the weight of the zoetrope to be supported independently of the phonograph turntable, the frame 48 may be provided with a lug 70 carrying a stop screw 71 engaging a lug 22 on the arm 47. When this arrangement is employed and the stop screw 71 is adjusted, the weight of the zoetrope is supported by the arm 47 through the medium of the screw 71 which is adjusted so that the coupling 63 is under sufficient tension to form a driving connection between the phonograph record and the zoetrope drum.

As diagrammatically illustrated in Fig. 6, the zoetrope drum may have its independent supporting and driving mechanism and casing, and may be entirely separate structurally from the phonograph. In this case, the table 72 of the zoetrope is driven by its own motor 73 through a variable speed drive 74 so that the rotation of the zoetrope drum can be brought into synchronous speed with the rotation of the phonograph disk record.

In making the picture record 23, I have found that the picture when made should be narrowed out of proportion to compensate for the attenuation of the pictures as viewed through the scanning slots of the drum due to the difference in linear speeds between the scanning drum and the inwardly spaced picture sleeve. If pictures are drawn in natural proportions, they would have a width out of proportion when being observed through the scanning drum, and it is therefore necessary to take into consideration the distance between the surface of the picture record and the slots in the drum in drawing the pictures.

Variations and modifications may be made within the scope of the claim and portions of the improvements may be used without others.

I claim:

In a device of the character described, in combination, a zoetrope having a light conductive tapered picture drum, a slotted scanning drum encircling and spaced from said picture drum, a record turntable mounted on said scanning drum for concentric rotation therewith, a common base member for said scanning drum, said picture drum and said turntable, means for continuously rotating said common base for rotating said turntable and said picture drum each at its determinate peripheral speed to reproduce sound and display animated pictures in synchronism, a picture sleeve of flexible sheet material tapered to conform to said tapered picture drum, having around its perimeter a continuous succession of pictures of the same object in progressively changing attitudes of movement from and back to a determinate attitude, said pictures being narrowed out of proportion to compensate for the attenuation of the picture as viewed through the scanning drum due to the difference in linear speeds between the scanning drum and the inwardly spaced picture sleeve, said picture sleeve being removably mounted on said picture drum, and an electric light bulb in said picture drum.

References Cited in the file of this patent

UNITED STATES PATENTS

| | | |
|---|---|---|
| 813,860 | Carter | Feb. 27, 1906 |
| 1,170,325 | Poposkey | Feb. 1, 1916 |
| 1,643,670 | Loughridge | Sept. 27, 1927 |
| 2,092,761 | Klein | Sept. 14, 1937 |
| 2,326,397 | Schwartz | Aug. 10, 1943 |
| 2,499,646 | Horn | Mar. 7, 1950 |
| 2,538,407 | Allen | Jan. 16, 1951 |
| 2,561,971 | Bustanoby | July 24, 1951 |
| 2,705,435 | Soo Hoo | Apr. 5, 1955 |

FOREIGN PATENTS

| | | |
|---|---|---|
| 537 | Great Britain | of 1860 |
| 24,031 | Great Britain | of 1893 |
| 277,579 | Great Britain | Sept. 22, 1927 |